United States Patent
Fiss et al.

(10) Patent No.: US 12,072,000 B2
(45) Date of Patent: Aug. 27, 2024

(54) BELT

(71) Applicant: ContiTech Antriebssysteme GmbH, Hannover (DE)

(72) Inventors: Tim Fiss, Hannover (DE); Heiko Sattler, Wedemark (DE)

(73) Assignee: ContiTech Antriebssysteme GmbH, Hannover (DE)

( * ) Notice: Subject to any disclaimer, the term of this patent is extended or adjusted under 35 U.S.C. 154(b) by 0 days.

(21) Appl. No.: 18/558,854

(22) PCT Filed: Apr. 14, 2022

(86) PCT No.: PCT/DE2022/200072
§ 371 (c)(1),
(2) Date: Nov. 3, 2023

(87) PCT Pub. No.: WO2022/237939
PCT Pub. Date: Nov. 17, 2022

(65) Prior Publication Data
US 2024/0240692 A1    Jul. 18, 2024

(30) Foreign Application Priority Data
May 12, 2021   (DE) ............. 10 2021 204 863.3

(51) Int. Cl.
*F16G 1/12* (2006.01)
*F03D 80/00* (2016.01)
(Continued)

(52) U.S. Cl.
CPC ............... *F16G 1/12* (2013.01); *F03D 80/00* (2016.05); *F16G 1/28* (2013.01); *F16H 7/023* (2013.01);
(Continued)

(58) Field of Classification Search
CPC .......... F03D 3/068; F03D 7/0224; F16G 1/12; F16G 1/10; F16G 1/08; F16G 1/26; F16G 1/21; F16G 1/28
(Continued)

(56) References Cited

U.S. PATENT DOCUMENTS 5,712,034 A * 1/1998 Stevens ............... D07B 1/0666
474/271
6,523,400 B1 * 2/2003 Ahmed ............... G01M 13/023
73/114.77
(Continued)

FOREIGN PATENT DOCUMENTS

| EP | 2014725 A1 | 1/2009 |
| EP | 2101079 A2 | 9/2009 |
| JP | 2002195352 A | 7/2002 |

OTHER PUBLICATIONS

International Search Report and Written Opinion dated Jun. 23, 2022 of International Application PCT/DE2022/200072 on which this application is based.

*Primary Examiner* — Henry Y Liu
(74) *Attorney, Agent, or Firm* — Richard A. Wolf; Gregory J. Adams

(57) ABSTRACT

A belt, preferably for use in a device for rotor blade adjustment on a wind turbine, includes a base body made of polymeric material and at least one strength member made of metallic material, which is embedded in the base body and running in the longitudinal direction. The belt has a first surface and a second surface situated opposite the first surface, in which at least the first surface has a reinforcing fabric. The belt has at least one sacrificial anode made of a metallic material, in which the metallic material is less noble than the metallic material of the strength member.

15 Claims, 2 Drawing Sheets

(51) Int. Cl.
 *F16G 1/28* (2006.01)
 *F16H 7/02* (2006.01)
(52) U.S. Cl.
 CPC ..... *F05B 2260/504* (2013.01); *F05B 2260/79* (2013.01); *F05B 2280/2006* (2013.01)
(58) Field of Classification Search
 USPC ........................................................ 474/205
 See application file for complete search history.

(56) References Cited

U.S. PATENT DOCUMENTS

| | | | | |
|---|---|---|---|---|
| 7,212,776 | B2 * | 5/2007 | Takagi | G03G 15/2057 |
| | | | | 399/333 |
| 11,434,869 | B2 * | 9/2022 | Hug | F03D 3/005 |
| 2005/0084303 | A1 * | 4/2005 | Takagi | G03G 15/2057 |
| | | | | 399/333 |
| 2010/0183892 | A1 * | 7/2010 | Banziger | C09D 5/106 |
| | | | | 427/386 |
| 2013/0171463 | A1 * | 7/2013 | Chang | D07B 1/162 |
| | | | | 427/427 |
| 2020/0116124 | A1 * | 4/2020 | Yuan | F03D 7/0224 |
| 2020/0149508 | A1 * | 5/2020 | Hug | F03D 3/005 |
| 2020/0149510 | A1 * | 5/2020 | Hug | F03D 3/068 |
| 2020/0378470 | A1 * | 12/2020 | Parziale | F16H 7/023 |

* cited by examiner

BELT

RELATED APPLICATIONS

This application is a national phase of International Application No. PCT/DE2022/200072 filed Apr. 14, 2022, which claims priority to German Application No. 10 2021 204 863.3 filed May 12, 2021, each of which is incorporated herein by reference in its entirety.

TECHNICAL FIELD

The application relates to a belt, preferably for use in a device for rotor blade adjustment on a wind turbine. The application also relates to a device for rotor blade adjustment having a belt of this kind, and to a wind turbine with rotor blade adjustment of this kind.

BACKGROUND

The generation of electrical energy by wind turbines is particularly effective when the wind turbine or the generator can operate close to its rated power. In the event of different wind speeds, this is efficient and material-saving for the entire installation when the rotation speed of the rotor is kept approximately constant in spite of fluctuating wind strengths. Precise power regulation is therefore particularly important for the smooth running of the generator. Nowadays, power consumption is usually regulated by turning the rotor blades. The rotor blades are moved to different positions in relation to the incoming flow of the wind by a blade adjustment drive, known as the rotor blade adjustment means.

In light winds, the rotor blades are adjusted, for example, such that the rotor blade profile faces the flow with a large pitch angle, i.e. with almost its full width. As the wind picks up, the pitch angle is then increasingly reduced until the blades are directed parallel to the wind flow (feathered position) in the event of storm-force winds and in extreme cases the rotor stops and no longer turns. Rotor blade adjustment is therefore one of the most important regulating systems in a modern wind turbine. Regulation of the adjustment is also referred to as "pitch regulation".

Different electrical and hydraulic systems exist for the adjustment mechanism as such, namely electromechanical adjustment devices with gear drives/spur gear mechanisms, hydraulic adjustment devices with cylinders, often for each individual rotor blade, as well as the adjustment device for the rotor blades via a traction mechanism drive, as in the case of the present application.

Depending on the individual systems, blade adjustment is possible by up to 180 degrees about the blade rotation axis oriented perpendicular to the rotor rotation axis, as a result of which the rotor blades can be swiveled in a range which extends from their maximum power to the "feathered position" or braking.

The spur gear solutions that still dominate today for adjustment require a relatively high level of maintenance since, amongst other things, the lubricating film has to be retained during tooth engagement, i.e. re-greasing has to be carried out at regular intervals.

This disadvantage is avoided by an adjustment device for the rotor blades via a traction mechanism drive designed as a toothed belt drive. In such an adjustment device, a toothed belt runs in an interengaging manner over a drive pulley connected to a drive motor and further over a gear rim attached to the foot of the rotor blade. The rotor blade can then be turned continuously in any way owing to the radial force acting on the gear rim periphery via the toothed belt.

When wind turbines are used at sea, also called offshore, the drive belt is exposed to high humidity with high salinity. This electrolyte can penetrate the tooth-side fabric of the belt and come into contact with the tension strand of the toothed belt, which tension strand usually consists of steel cord in this application. As a result, the steel cord can corrode, which can lead to a reduction in strength and premature failure of the belt.

Known measures for preventing corrosion of the steel cord are complete sheathing of the steel cord with an elastomeric material to prevent contact with the electrolyte or replacement of the steel cord with another non-metallic material. Both solutions are associated with considerable increases in production costs, increased friction in the tooth engagement region and/or poorer strength properties.

Cathodic corrosion protection for steel components is known from completely different technical fields of application, such as pipelines and other stationary structures, by using a conductively connected sacrificial anode in joint contact with an electrolyte. The sacrificial anode consists of a less noble metal than the metal of the component to be protected against corrosion. In other words, the material of the component to be protected against corrosion is classified as more positive in the electrochemical voltage series than that of the sacrificial anode. This more noble metal forms the cathode and is protected against corrosion until the sacrificial anode has corroded away.

Cathodic corrosion protection can be provided with or without external current. In the case of cathodic corrosion protection with external current, a voltage is applied to an external current anode. Cathodic corrosion protection without external current is preferably used when metals come into contact with water as an electrolyte. The cathode and the anode are connected to each other via the electrically conductive electrolyte in a closed circuit, so that a current, fed from a redox reaction of the oxidation of the sacrificial anode, can flow.

In this context, EP 2 014 725 A1, which discloses cathodic corrosion protection for reinforcements of reinforced concrete plants, should be mentioned, for example. In this case, cathodic corrosion protection is implemented by means of an epoxy resin composition with a high proportion of zinc particles as filler. The epoxy resin composition is applied directly to the reinforcing steel in this case.

Technical solutions for the use of cathodic corrosion protection on belts, in particular on drive belts, are not known from the prior art.

SUMMARY

The present disclosure is based on an aspect of providing a belt in which corrosion of the steel cord can be prevented as far as possible. By preventing corrosion, the strength properties of the steel cord should be able to be maintained in unchanged form as far as possible over the entire service life of the belt. In particular, the object is to provide a solution for corrosion protection of the steel cord that is compatible with customary production processes for the belt without significantly changing the production process. In particular, the existing properties of the coefficient of friction and the wear resistance of the surface of the belt should not be adversely affected.

This aspect is achieved by a belt having a sacrificial anode composed of a metallic material that is less noble than the metallic material of the strength member.

According to an aspect a belt, preferably for use in a device for rotor blade adjustment on a wind turbine, comprising a base body composed of polymeric material and at least one strength member composed of metallic material, preferably of steel, and embedded in said base body and running in the longitudinal direction, the circumferential direction or the running direction of the belt, comprising a first surface and a second surface situated opposite the first surface, wherein at least the first surface has a reinforcing fabric. According to the invention, the belt is characterized by at least one sacrificial anode composed of a metallic material, wherein the metallic material is less noble than the metallic material of the strength member. The reinforcing fabric can be formed from polyamide, for example.

In this case, a belt includes all embodiments of belt conveyors, conveyor belts or transportation belts as well as an extremely wide variety of belt-like power transmission means such as drive belts, in particular toothed belts, flat belts, V-belts and V-ribbed belts. These belts can have a particular length and be both of endlessly closed design and be length sections with two ends. Belts of this kind can be used in the automotive sector, plant and mechanical engineering or other industrial applications. Belt drive systems with steel cords affected by moisture are particularly relevant for the subject matter of the present invention.

The sacrificial anode is formed from a metallic material that is less noble than the metallic material of the strength member. In other words, the metallic material of the sacrificial anode is classified as more negative in the electrochemical voltage series compared to the material of the strength member. The material classified in the electrochemical voltage series as more negative can represent an anode in a galvanic element, while the more noble material, which is classified in the electrochemical voltage series as more positive, can represent the cathode.

In contact with an electrolyte, which can be formed, for example, by saline water in the case of offshore use of a wind turbine designed with the belt according to the invention, an electrical circuit between cathode and anode can be closed. In this case, the material of the anode can be oxidized with the release of electrons, while the material of the cathode is reduced with the absorption of electrons, whereby the material of the cathode can be protected against corrosion with the formation of hydrogen at the anode.

Graphite forms a particularly advantageous material for the sacrificial anode when used in a belt containing steel cord as the cathode. Graphite can be integrated into a belt in a particularly advantageous manner in an extremely wide variety of embodiments and particle sizes.

The integration of a sacrificial anode into a belt containing steel cord can prevent premature corrosion of the steel cord in a particularly advantageous manner. Therefore, the strength properties of the steel cord can be maintained in unchanged form, and this can extend the change interval or the service life of the belt.

In particular when using the belt according to the invention in a device for rotor blade adjustment on a wind turbine, in particular in offshore applications, economic advantages may arise for operators since the operational reliability of the wind turbine can be increased. This can reduce unplanned and, owing to the high level of logistical effort, very expensive maintenance measures.

According to a further aspect, the belt has a plurality of strength members, wherein the strength members are spaced apart from each other and form at least one arranged spooling gap between each other. In this case, the sacrificial anode runs in a rope-like manner, parallel to the strength member, in the spooling gaps. This results in a particularly advantageous manner in the sacrificial anode being able to be laid with the same device during the spooling process of the steel cord. Furthermore, a sacrificial anode of rope-like design can additionally serve as a strength member and increase the load-bearing capacity of the belt.

A further advantageous embodiment is that the sacrificial anode is designed as a sheet-like structure and arranged between the reinforcing fabric and the base body composed of polymeric material. This allows the belt structure to be maintained as known, as a result of which no adjustments to the manufacturing process are required. The sacrificial anode designed as a sheet-like structure can be installed with the existing devices of the manufacturing installation which also apply the reinforcing fabric to the base body of the belt. The arrangement of the sacrificial anode between the reinforcing fabric and the base body of the belt allows the frictional properties of the belt surface to be maintained.

According to a further aspect of the present invention, the sacrificial anode has a perforation, wherein the perforation is at least partially filled by the polymeric material. Perforation is understood to mean through-holes in the sacrificial anode through which the polymeric material can pass during the production process. Therefore, a sufficient connection between the polymeric material of the belt body and the sacrificial anode can be ensured. In particular, during production of toothed belts using the casting process, this embodiment of the sacrificial anode can prove to be particularly advantageous since the polymeric material can penetrate the individual components or the gaps, pores or openings between them or in them as far as into the tooth region.

According to a further aspect, the sacrificial anode is designed as a mixture additive in the polymeric material. As a result, the manufacturing process for the belt according to the invention can be optimized in such a way that all material handling of the additional material component for the sacrificial anode in the assembly process is dispensed with. The mixture is usually produced locally and spatially separately from the production process for the belt body and the individual fabric and strength member layers. In other words, the conventional assembly process for a belt can be applied in unchanged form for the production of a belt with a sacrificial anode. This can reduce additional costs for the industrialization of the belt according to the invention.

According to a further aspect, the sacrificial anode is designed as a coating of the reinforcing fabric. This can also result in the advantages explained above of shifting the process-specific adaptations from the assembly process to the material preparation stage, which is spatially and temporally separate from said assembly process.

A further advantageous embodiment is that the sacrificial anode contains carbon, preferably graphite or carbon black, or preferably is formed from it. Since carbon, graphite or carbon black is known and proven as a constituent of belts, the use thereof can result in the mechanical properties of the belt being able to be maintained as an additional function of a sacrificial anode. In other words, the sacrificial anode does not alter the mechanical properties of the belt when it is advantageously formed from carbon, graphite or carbon black.

According to a further aspect, the belt is of open design, that is to say the belt forms a length section which has a first and a second end. The strength member and the sacrificial anode can each be contacted separately from each other at both the ends. Therefore, the described advantages of cathodic corrosion protection can be transferred to belts with open ends.

This advantageously means that, according to a further aspect, an external voltage for implementing active cathodic corrosion protection with external current can be applied owing to the contacting capability. The external voltage can increase the effectiveness of corrosion protection for the steel cord of the belt.

According to a further aspect, the belt is of endlessly closed design. Therefore, the described advantages of cathodic corrosion protection can be transferred to endlessly closed belts.

According to a further aspect, the belt is designed as a toothed belt. Therefore, the described advantages of cathodic corrosion protection can be transferred to toothed belts.

According to a further aspect, the polymeric material is formed from polyurethane. This advantageously means that the described advantages of cathodic corrosion protection can be transferred to belts composed of polyurethane.

A further advantageous embodiment provides a device for rotor blade adjustment of a wind turbine, having at least one belt according to the invention. Particularly in the case of devices for rotor blade adjustment on wind turbines at sea, also called offshore, saline seawater can cause corrosion of the steel cords of the belt. Here, the application of the solution according to the invention for corrosion protection of the steel cords is particularly advantageous since unplanned maintenance and servicing work can be prevented owing to a high level of fail-safety of the belt.

According to a further aspect, a wind turbine having at least one device according to the invention for rotor blade adjustment is provided. The above-mentioned advantages can therefore be transferred to a wind turbine. The use of the device according to the invention can result in economic advantages for the operator of the wind turbine since the operational reliability can be increased and unplanned maintenance and servicing work can be prevented owing to a high level of fail-safety of the belt.

SUMMARY DESCRIPTION OF DRAWINGS

Various exemplary embodiments of the invention are explained in more detail below with reference to figures.

Figure 1:
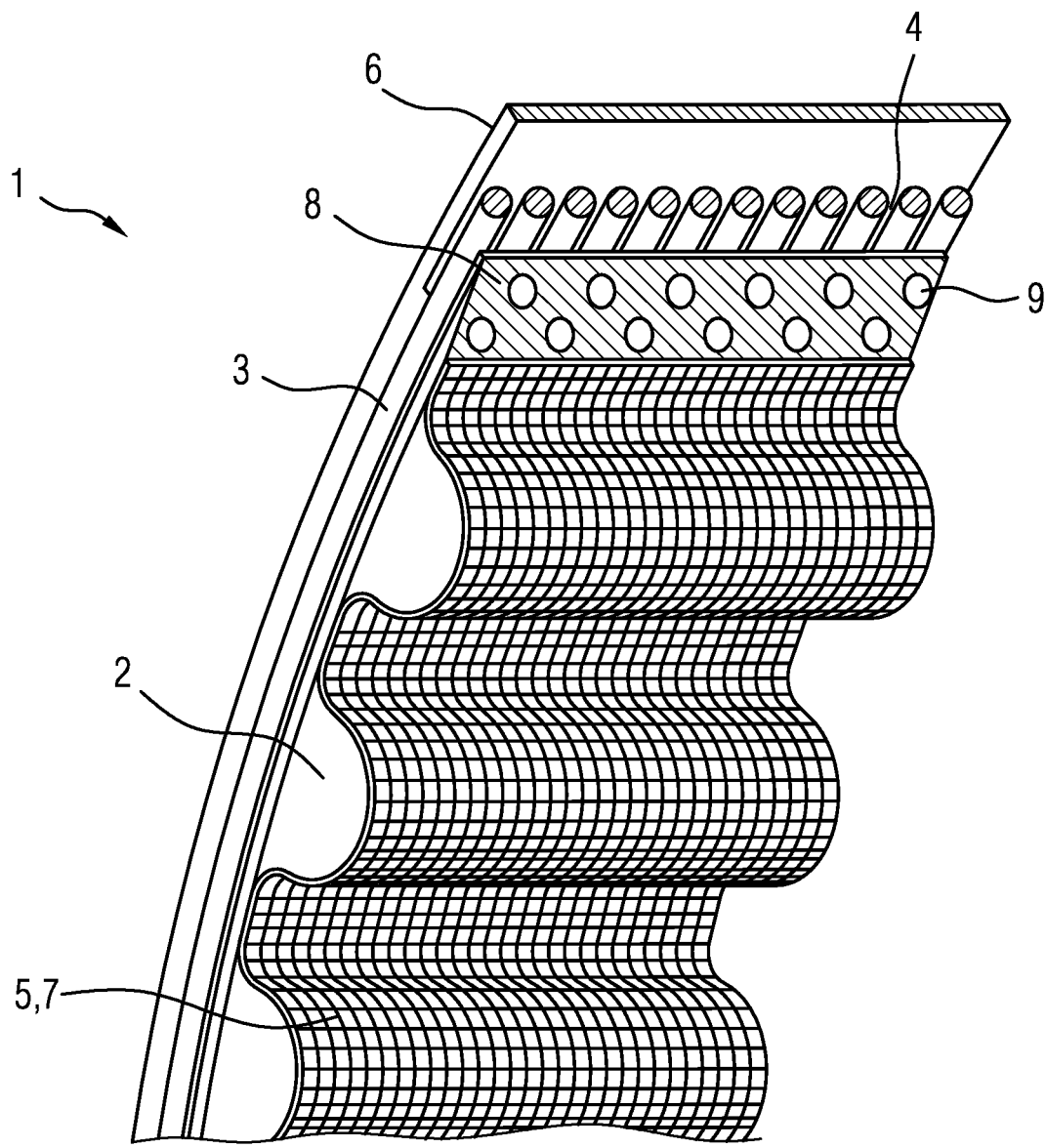
FIG. 1 shows a sectional illustration of the arrangement of the individual components of a toothed belt according to the invention.

FIG. 1 shows a toothed belt 1 according to the invention. The toothed belt 1 has, as viewed from the first surface 5, a layer-by-layer structure made up of a reinforcing fabric 7 composed of polyamide, a base body 2 composed of polyurethane, a sacrificial anode 8 and a strength member 3 in the form of rope-like tension strands composed of steel, which form spooling gaps 4 between each other in the transverse direction, the strength member being oriented in the circumferential direction of the belt 1 and running parallel to said sacrificial anode in the transverse direction of the belt 1. The second surface 6, which in this case forms the belt back, is covered with a fabric to protect the base body 2. In the illustrated exemplary embodiment, the sacrificial anode 8 is embodied as a sheet-like structure which has a perforation 9 in the form of circular through-holes. The perforation 9 serves to ensure that the polyurethane of the base body 2 penetrates said sacrificial anode during production of the belt 1 and in this way embeds the sacrificial anode 8 in the base body 2, so that a cohesive connection of high load-bearing capacity between the polyurethane of the base body 2 and the sacrificial anode 8 is achieved.

The material of the sacrificial anode 8 consists of graphite, which is classified in the electrochemical voltage series as more negative than the steel material of the strength member 3. The steel material of the strength member 3 represents the more noble material, which is classified in the electrochemical voltage series as more positive and represents the cathode in a galvanic element.

Figure 2:
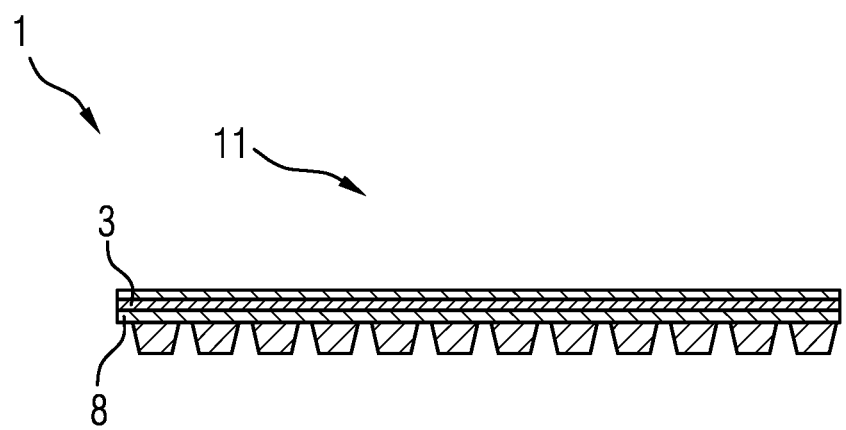
FIG. 2 shows a schematic illustration of a belt with a passive sacrificial anode.

FIG. 2 shows a schematic illustration of the above-described belt with a passive sacrificial anode 8. A passive sacrificial anode 8 is understood to mean that the electrical circuit is not supplied with any external voltage 10, cf. FIG. 3. The belt 1 is shown in a wet environment 11. The wet environment 11 is understood to mean an environment with high saline humidity, this being a customary condition when using a belt 1 on wind turbines at sea. Therefore, the humidity is already very high owing to the surrounding saline seawater and is intensified by the direct contact between the belt 1 and sea spray and splash water. The saline seawater is electrically conductive and closes the electrical circuit between the cathode or the strength member 3 and the sacrificial anode 8. In this case, the graphite of the sacrificial anode 8 is oxidized with the release of electrons, while the steel of the strength member 3 is reduced with the absorption of electrons, whereby the strength member 3 is protected against corrosion with the formation of hydrogen at the sacrificial anode 8.

Figure 3:
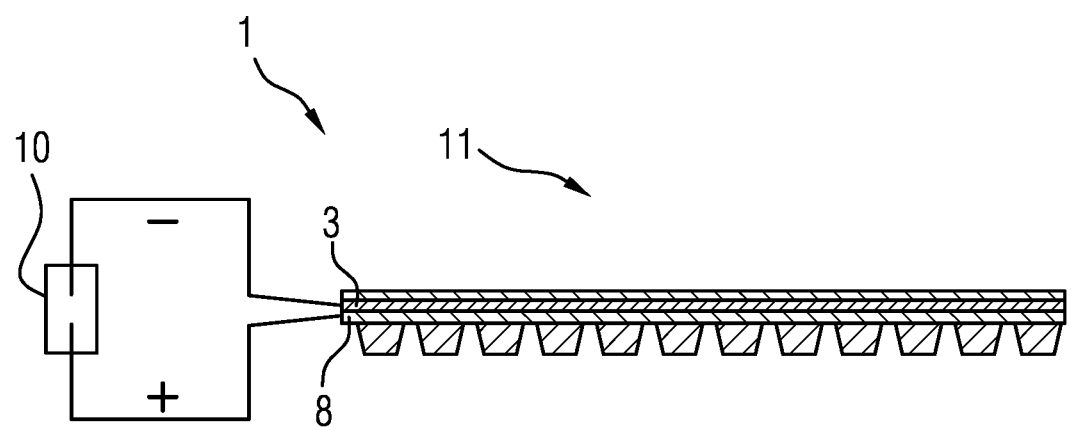
FIG. 3 shows a schematic illustration of a belt with an active sacrificial anode.

FIG. 3 shows a schematic illustration of the belt 1 described at the outset with an active sacrificial anode 8. In this context, active means that the electrical circuit between the strength member 3 and the sacrificial anode 8 via the electrolyte is additionally closed with an external power supply 10. The process of oxidation of the sacrificial anode 8 and reduction in the strength member 3 proceeds as explained in the description of FIG. 2. The additional power supply 10 further enhances the effectiveness of the corrosion protection. Active cathodic corrosion protection is suitable for use in belts 1 which are used as piece goods, that is to say as a belt section having a predetermined length. Belts 1 of this kind have an open cross section on both sides, both the strength member 3 and the sacrificial anode 8 being able to be contacted at the open cross sections, this allowing an external voltage 10 to be applied.

LIST OF REFERENCE SIGNS (PART OF THE DESCRIPTION)

1 Belt
2 Base body
3 Strength member
4 Spooling gap
5 First surface
6 Second surface
7 Reinforcing fabric
8 Sacrificial anode
9 Perforation
10 External power supply
11 Humid ambient air

The invention claimed is:
1. A belt comprising:
a base body made of polymeric material and at least one strength member made of metallic material, the at least one strength member being embedded in the base body and running in a longitudinal direction of the belt, a first surface and a second surface situated opposite the first surface, wherein at least the first surface has a reinforcing fabric, and a sacrificial anode made of a metallic material, wherein the metallic material of the sacrificial anode is less noble than the metallic material of the at least one strength member.

2. The belt according to claim 1, wherein:

the belt has a plurality of strength members, wherein the strength members are spaced apart from each other and form at least one arranged spooling gap between each other, wherein the sacrificial anode runs in a rope-like manner, parallel to the strength members, in the spooling gap.

3. The belt according to claim 1, wherein:

the sacrificial anode is designed as a sheet-like structure and arranged between the reinforcing fabric and the base body.

4. The belt according to claim 3, wherein:

the sacrificial anode has a perforation, wherein the perforation is at least partially filled by the polymeric material of the base body.

5. The belt according to claim 1, wherein:

the sacrificial anode is designed as a mixture additive in the polymeric material of the base body.

6. The belt according to claim 1, wherein:

the sacrificial anode is designed as a coating of the reinforcing fabric.

7. The belt according to claim 1, wherein:

the belt is of open design, wherein the strength member and the sacrificial anode can each be contacted separately from each other at the ends.

8. The belt according to claim 7, wherein:

an external voltage is applied to the contacted sacrificial anode and the strength member.

9. The belt according to claim 1, wherein:

the metallic material of the strength member is steel.

10. The belt according to claim 1, wherein:

the sacrificial anode contains carbon.

11. The belt according to claim 1, wherein:

the polymeric material of the base body is formed from polyurethane.

12. The belt according to claim 1, wherein:

the belt is of endlessly closed design.

13. The belt according to claim 1, wherein:

the belt is designed as a toothed belt.

14. A device for rotor blade adjustment of a wind turbine, having at least one belt according to claim 1.

15. A wind turbine having at least one device for rotor blade adjustment as claimed in claim 14.

* * * * *